H. D. STEVENS.
TRIMMING MACHINE.
APPLICATION FILED AUG. 8, 1917.

1,347,976.

Patented July 27, 1920.

Witnesses:

Inventor
Horace D. Stevens,

H. D. STEVENS.
TRIMMING MACHINE.
APPLICATION FILED AUG. 8, 1917.
1,347,976.
Patented July 27, 1920.
2 SHEETS—SHEET 2.
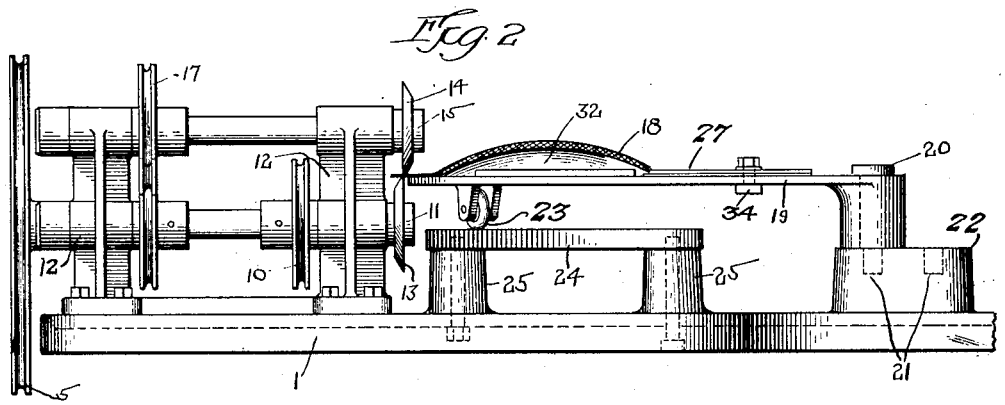
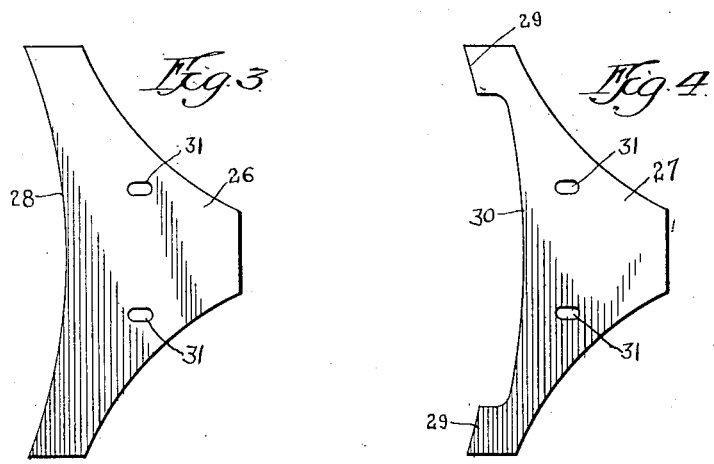
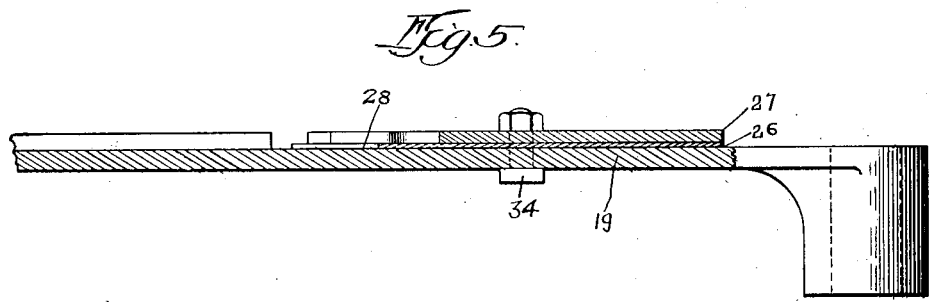
Witnesses:
Inventor
Horace D. Stevens,
By Wilkinson & Huxley
Attys

UNITED STATES PATENT OFFICE.

HORACE D. STEVENS, OF SUMMIT COUNTY, OHIO, ASSIGNOR TO THE FIRESTONE TIRE & RUBBER COMPANY, OF AKRON, OHIO, A CORPORATION OF OHIO.

TRIMMING-MACHINE.

1,347,976.     Specification of Letters Patent.     Patented July 27, 1920.

Application filed August 8, 1917. Serial No. 185,157.

*To all whom it may concern:*

Be it known that I, HORACE D. STEVENS, a citizen of the United States, residing in the county of Summit and State of Ohio, have invented certain new and useful Improvements in Trimming-Machines, of which the following is a specification.

This machine relates to apparatus for use in trimming articles the edges of which are rough when manufactured and are required to be trimmed. It makes provision for an easy means of securing a "roughing off" cut and then a final cut, by which the article can be quickly and accurately trimmed to the desired size and shape. The machine herein shown is adaptable for trimming what are termed "blow-out" patches for use in repairing automobile tires, but it is understood that the principles of the invention may be made use of for other purposes. "Blow-out" patches are composed of several layers of rubber and fabric cured together on a drum or in a press which when cured have a rough uneven edge which requires trimming. It was formerly the practice to trim the patches by means of shears, but by the use of the apparatus herein shown it is possible to more quickly and neatly trim the articles along the curved edges.

In the drawing accompanying this application Figure 1 is a plan view of the apparatus.

Fig. 2 is a side elevation showing a patch in section on the apparatus.

Fig. 3 is a view of the finishing cut guide.

Fig. 4 is a view of the rough cut guide, and

Fig. 5 is a cross section through the work support.

Figure 1:
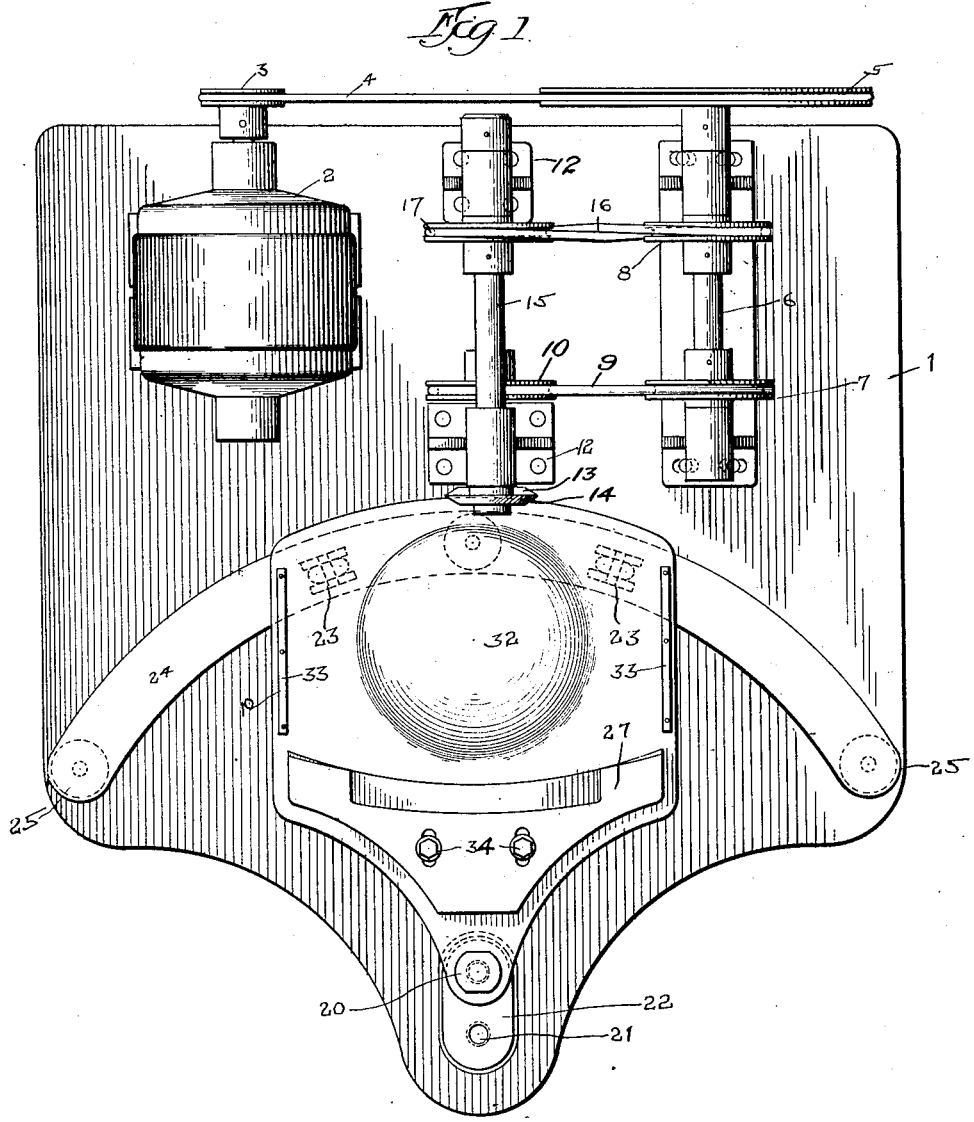

Before entering into a detailed description of the machine it will be understood that the article which it is especially designed to trim is composed of strips of fabric and rubber vulcanized together the patch being curved on the two sides and bulging slightly in the center. The curved sides, when taken from the curing apparatus are rough in contour due to imperfections in manufacture and to rubber strings or skins adhering to it. It is, therefore, necessary to make what is termed a rough cut, first on one side of the patch, the patch is then turned and with the rough cut as a basis a finish cut is given to the other side. The patch may be then turned again and with the finished side as a basis the other side is also given a finish cut.

The apparatus is mounted on a base plate 1 in one corner of which is located a motor 2, carrying a drive pulley 3 connected by a belt 4 with a larger pulley 5. The pulley 5 is secured to one end of a shaft 6 which carries two smaller pulleys 7 and 8. The pulley 7 is connected by a direct belt 9 to a pulley 10 mounted on a shaft 11 rotated in brackets 12 centrally of the plate, the shaft carrying one knife disk 13. A coöperating knife disk 14 is carried on the end of a shaft 15 mounted in the brackets 12 directly above the shaft 11. Rotary motion is imparted to the shaft 15 from the pulley 8 by a crossed belt 16 running over pulley 17 carried on the shaft. By the means described the knives 13 and 14 are given a rapid rotation in opposite directions so as to trim off the edge of the patch shown at 18.

A table or work plate which is indicated by the numeral 19 is supported on the base 1, being mounted on a pivot pin 20, the lower end of which is received in a socket 21 formed on the upper surface of a lug 22 rising from the base opposite the knives 13 and 14. Two sockets 21 are provided so as to furnish a certain amount of adjustment to enable the apparatus to be used on patches of different sizes as will be readily understood. The forward edge of the plate is formed on an arc having the pin 20 as a center, and is so located and proportioned that it will pass close to the knives, supporting the edge of the flap in position to be passed between them. To the underside of the work table are secured two rollers 23 which are adapted to run on a semicircular rail 24 supported on three lugs or projections 25 formed on the upper side of the base, the rail being located so that the rollers will run on it in either position in the holes 21, while the plate is oscillated about on the pin 20.

The upper side of the table carries two stops or guide plates, one shown at 26 in Fig. 3, which is for the finish-cut, and the other at 27 which is for the rough-cut. The first named plate is formed on one side in an arc similar to that of the finished cut, as shown at 28, and the second named plate is formed with two projections or horns 29 and with a central recess 30 into which the rough, uneven edge may project for the roughing-off cut. Slots 31 are formed in both plates by means of which they may be adjustably held on the table 19 by bolts 34. The guide or stop 26 is preferably thinner than the stop 27 and is placed under it, the two plates being assembled with their forward surfaces superimposed. In the center of the plate is formed a bulbed formation 32 on which the central or concave portion of the patch 18 may rest, thus being positioned relatively to the knives. Edge guides 33 being also provided for the ends of the patch.

The knives being maintained in constant rapid rotation the operator places the untrimmed patch over the bulbed formation 32 with one of the rough untrimmed edges of the patch against the horns 29 of the plate 27, the central portion projecting into the recess 30. The work table 19 is now swung around on the pivot 20 and the knives make the first or roughing-off cut. When the plate has swung around until the knives finish the cut the patch is reversed and the rough cut edge placed next to the stop 26. The plate 19 is then swung around and the other edge of the patch trimmed accurately to the finish cut. If desired, the patch may now be turned with the finish cut in contact with the lower guide plate or stop 26 and the rough cut edge given a final trim.

It is obvious that changes and modifications may be made in the apparatus as shown without departing from the spirit of the invention or sacrificing any of its benefits.

I claim:

1. A machine for trimming the edges of blow out patches having a central concave portion, an oscillating work table, a knife located at one edge of said table, a guide at the rear of said table opposite the knife, and a bulbed formation on the table adapted to fit within and support the central concave portion of the patch.

2. In a trimming apparatus, the combination of a knife, an oscillatory work table pivoted adjacent the knife, a pair of superposed guides secured to the work table facing said knife, one of said guides being for a rough cut and the other for a finish cut, said guides forming abutments against which may be placed the edge of the article opposite the one which is being trimmed, and a bulbed formation on said table adapted to fit a concavity in the article.

3. In a trimming apparatus, the combination of a knife, a work table adjacent the knife, a pivot for said work table, a portion of said table being arranged to support the edge of the article and pass it into said knife, and a pair of guides secured on the work table facing said knife, one of said guides being for a rough cut and the other for a finish cut, said guides forming abutments against which may be placed the edge of the article opposite the one which is being trimmed.

4. An apparatus for trimming articles having a concave central portion comprising a knife, a work table adjacent the knife, means for causing relative travel between said knife and said table, a pair of guides secured to said table, one of said guides being for rough cut and the other for a finish cut, said guides forming abutments against which may be placed the edge of the article opposite the one which is being trimmed, and a bulbed formation on said work table corresponding with the concave formation of said article.

HORACE D. STEVENS.